M. SPOFFORD.
Steam Plow.
No. 5,290.
Patented Sept. 11, 1847.
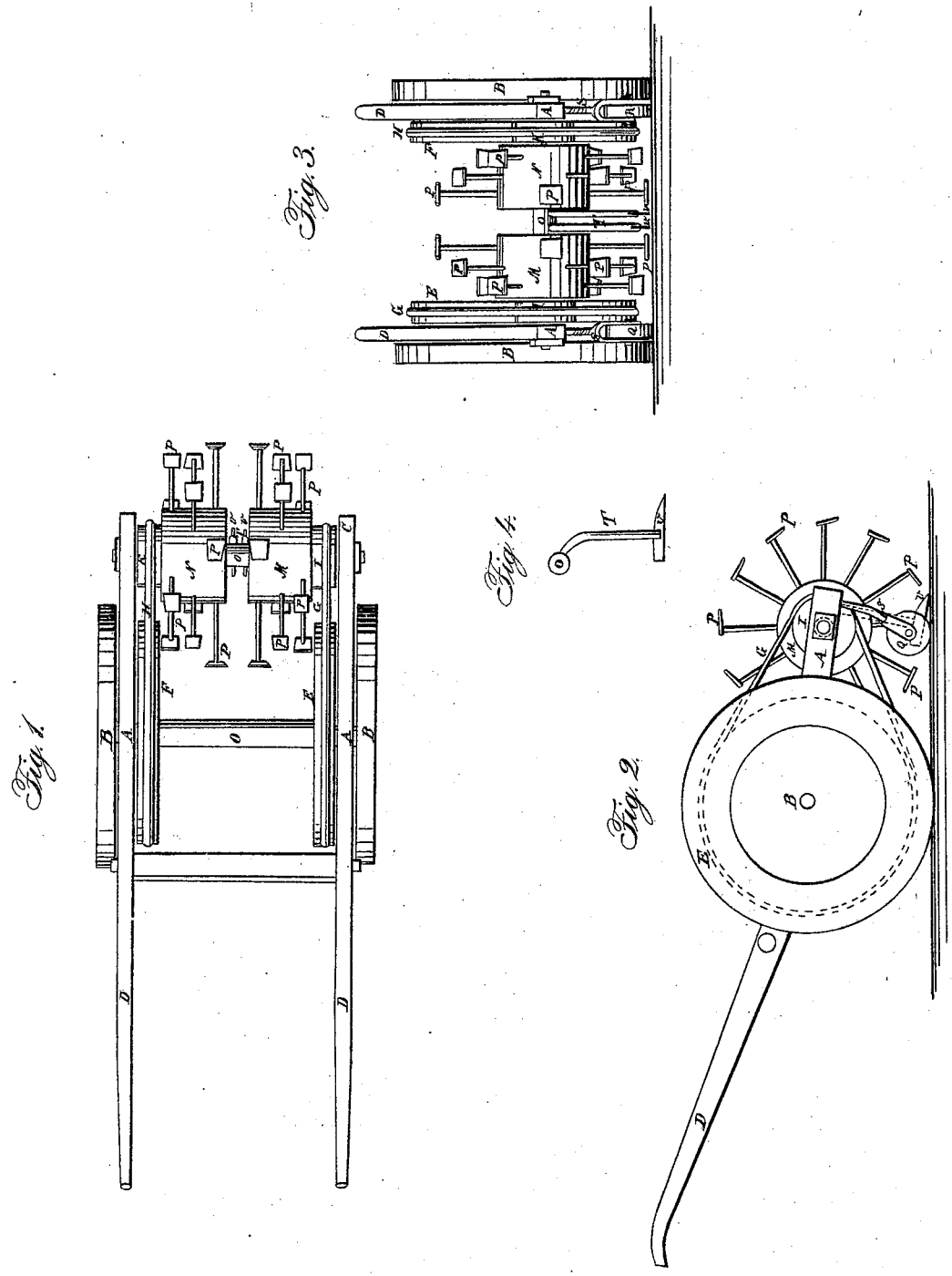

UNITED STATES PATENT OFFICE.

MOSES SPOFFORD, OF GEORGETOWN, MASSACHUSETTS.

IMPROVEMENT IN MACHINES FOR HOEING LAND.

Specification forming part of Letters Patent No. 5,290, dated September 11, 1847.

*To all whom it may concern:*

Be it known that I, MOSES SPOFFORD, of Georgetown, in the county of Essex and State of Massachusetts, have invented a new and useful Improvement in Machinery for Hoeing Land; and I do hereby declare that the same is fully described and represented in the following specification and accompanying drawings, letters, figures, and references thereof.

Of said drawings, Figure 1 represents a top view of my rotary hoeing-machine. Fig. 2 is a side elevation, and Fig. 3 is a front end elevation, of the same.

In said figures, A denotes a frame mounted on wheels B B, which are fixed to a horizontal shaft, C. Said frame has handles D D, to which the husbandman applies his hands to operate or press forward the machine in a manner similar to that by which he would a common wheelbarrow. On said shaft C are two pulleys, E F, arranged as seen in Fig. 1, one of the same being represented in Fig. 2 by dotted lines. From and around these pulleys belts or bands G H pass respectively to and around smaller pulleys, I K, affixed upon the sides of two cylinders, M N, arranged upon a fixed horizontal shaft, O, which extends across the front part of the frame A. Each of the said cylinders has any suitable number of hoes, P P, &c., affixed radially in and projecting from it, as seen in the drawings.

Q and R are small wheels applied to the front of the frame A by means of screw-shanks S S, which are screwed into the frame. By means of said screws the wheels may be adjusted in such manner as to cause the hoes to penetrate the soil to any required depth.

The shaft O has two rods, T T, projecting downward from it between the two cylinders M N, there being one of said rods to each of the cylinders. Each of the rods is placed as near to its cylinder as possible, and has a cross-piece, V, affixed to its lower end, as seen in Fig. 4, which denotes a side view of one of the rods and cross-pieces. The rod and cross-piece is exhibited in Fig. 2 in part by dotted lines. The object of the cross-pieces is to rest upon the soil or sods and hold them down to some extent while the hoes are in action upon them. The front rollers also aid in accomplishing a similar effect.

When the machine is moved forward the wheels B B will rotate, and through the pulleys E F and bands G H and pulleys I K will impart a rotary motion to the cylinders and hoes. As the latter revolve they strike the earth and break it up and hoe it somewhat in the same manner in which a common garden-hoe operates on it.

What I claim as my invention is—

The combination of one or more of the cross-pieces U V and their rods or other equivalents with the rotary hoes, the same being used in manner and for the purpose above described.

In testimony whereof I have hereto set my signature this 26th day of January, A. D. 1847.

MOSES SPOFFORD.

Witnesses:
GEORGE HUSTINGS,
CYRUS DORMAN.